(12) United States Patent
Yoshioka et al.

(10) Patent No.: US 12,075,386 B2
(45) Date of Patent: Aug. 27, 2024

(54) USER EQUIPMENT

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 193 days.

(21) Appl. No.: 17/598,456

(22) PCT Filed: Apr. 2, 2019

(86) PCT No.: PCT/JP2019/014711
§ 371 (c)(1),
(2) Date: Sep. 27, 2021

(87) PCT Pub. No.: WO2020/202483
PCT Pub. Date: Oct. 8, 2020

(65) Prior Publication Data
US 2022/0182982 A1 Jun. 9, 2022

(51) Int. Cl.
*H04W 4/00* (2018.01)
*H04L 1/08* (2006.01)
(Continued)

(52) U.S. Cl.
CPC ............... *H04W 72/02* (2013.01); *H04L 1/08* (2013.01); *H04W 72/52* (2023.01); *H04W 72/56* (2023.01)

(58) Field of Classification Search
CPC ..... H04W 72/02; H04W 72/52; H04W 72/56; H04W 4/40; H04W 92/18; H04L 1/08;
(Continued)

(56) References Cited

U.S. PATENT DOCUMENTS 11,483,100 B2 * 10/2022 Lee ..................... H04W 4/40
2019/0052436 A1 * 2/2019 Desai ................... H04L 5/0055
(Continued)

FOREIGN PATENT DOCUMENTS

WO     2018084608 A2    5/2018

OTHER PUBLICATIONS

International Search Report for corresponding International Application No. PCT/JP2019/014711, mailed Jun. 4, 2019 (4 pages).
(Continued)

*Primary Examiner* — Chuong T Ho
(74) *Attorney, Agent, or Firm* — Osha Bergman Watanabe & Burton LLP

(57) ABSTRACT

A user equipment includes a receiving unit configured to receive a configuration of a resource pool; a communicating unit configured to receive a physical control channel and a physical shared channel in the resource pool; a control unit configured to determine whether a response relating to retransmission control associated with the resource pool is enabled or disabled, based on the configuration of the resource pool; and a transmitting unit configured to transmit the response relating to the retransmission control with respect to the received physical shared channel, upon determining that the response relating to the retransmission control is enabled.

3 Claims, 10 Drawing Sheets

(51) Int. Cl.
*H04W 72/02* (2009.01)
*H04W 72/52* (2023.01)
*H04W 72/56* (2023.01)

(58) Field of Classification Search
CPC ... H04L 1/1854; H04L 1/1893; H04L 1/1896; H04L 2001/0092
USPC ......................................... 370/329, 330, 328
See application file for complete search history.

(56) References Cited

U.S. PATENT DOCUMENTS

| | | | |
|---|---|---|---|
| 2019/0373502 A1* | 12/2019 | Chae | H04W 72/12 |
| 2020/0029318 A1* | 1/2020 | Guo | H04L 1/1822 |
| 2020/0045674 A1* | 2/2020 | Tseng | H04W 72/04 |
| 2020/0112400 A1* | 4/2020 | Lee | H04L 1/1819 |
| 2020/0145867 A1* | 5/2020 | Tseng | H04B 7/06954 |
| 2020/0195371 A1* | 6/2020 | Tang | H04W 4/40 |
| 2020/0228247 A1* | 7/2020 | Guo | H04L 1/0025 |
| 2020/0229030 A1* | 7/2020 | Nguyen | H04L 1/1893 |
| 2020/0295883 A1* | 9/2020 | Lee | H04L 5/0057 |
| 2021/0243749 A1* | 8/2021 | Hoang | H04W 72/02 |
| 2021/0266846 A1* | 8/2021 | Do | H04L 5/001 |
| 2021/0377912 A1* | 12/2021 | El Hamss | H04L 1/1854 |
| 2022/0132603 A1* | 4/2022 | Adjakple | H04W 8/005 |
| 2022/0150914 A1* | 5/2022 | Lee | H04L 1/0026 |
| 2022/0182979 A1* | 6/2022 | Freda | H04W 72/56 |

OTHER PUBLICATIONS

Written Opinion for corresponding International Application No. PCT/JP2019/014711, mailed Jun. 4, 2019 (4 pages).
3GPP TS 36.211 V15.4.0; "3rd Generation Partnership Project; Technical Specification Group Radio Access Network; Evolved Universal Terrestrial Radio Access (E-UTRA); Physical channels and modification (Release 15)"; Dec. 2018 (240 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TSG RAN WG1 Ad-Hoc Meeting 1901; R1-1900481 "Sidelink physical layer procedures for NR V2X communication" Intel Corporation; Taipei, Taiwan; Jan. 21-25, 2019 (17 pages).
3GPP TSG RAN WG1 Ad-Hoc Meeting 1901; R1-1900794 "Physical Layer Procedures for NR V2X Sidelink" Interdigital Inc.; Taipei, Taiwan; Jan. 21-25, 2019 (10 pages).
3GPP TSG RAN WG1 Meeting #96; R1-1901931 "Discussion on physical layer procedure for NR V2X" LG Electronics; Feb. 25-Mar. 1, 2019 (12 pages).
3GPP TSG RAN WG1 #96; R1-1902596 "Discussion on Physical Layer Procedures for NR V2X Sidelink" InterDigital Inc.; Athens, Greece; Feb. 25-Mar. 1, 2019 (9 pages).
3GPP TSG RAN WG1 #96; R1-1902174 "Discussion on HARQ feedback for NR V2X communication" Sony; Athens, Greece; Feb. 25-Mar. 1, 2019 (5 pages).
Extended European Search Report issued in European Application No. 19923155.6, dated Oct. 19, 2022 (14 pages).
Office Action in the counterpart Chinese Application No. 201980094611.8, mailed May 25, 2023 (22 pages).
Office Action in the counterpart Chinese Application No. 201980094611.8, mailed Oct. 24, 2023 (14 pages).

* cited by examiner

USER EQUIPMENT

TECHNICAL FIELD

The present invention relates to a user equipment in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which user equipments directly communicate with each other without involving a base station apparatus, is being studied (for example, Non-Patent Literature 1).

D2D reduces the traffic between the user equipment and the base station apparatus, and enables communication between the user equipments even when the base station apparatus becomes unable to communicate in the event of a disaster, etc. Note that in 3GPP (3rd Generation Partnership Project), D2D is referred to as "sidelink"; however, in the present specification, D2D, which is a more general term, is used. However, sidelink is also used as necessary in the description of the embodiment to be described later.

D2D communication is generally classified into D2D discovery (also referred to as D2D detection) for finding other communicable user equipments and D2D communication (also referred to as D2D direct communication, inter-terminal direct communication, etc.) for user equipments to directly communicate with each other. In the following description, when D2D communication, D2D discovery, etc., are not particularly distinguished, these may be simply referred to as D2D. Further, a signal transmitted and received by D2D is referred to as a D2D signal. Various usage cases of services related to V2X (Vehicle to Everything) in NR have been studied (for example, Non-Patent Literature 2).

RELATED ART DOCUMENT

Non-Patent Document

Non-Patent Document 1: 3GPP TS 36.211 V15.4.0(2018-12)
Non-Patent Document 2: 3GPP TR 22.886 V15.1.0(2017-03)

SUMMARY OF THE INVENTION

Problem to be Solved by the Invention

In direct communication between terminals in NR-V2X, support of HARQ (Hybrid automatic repeat request) is being studied. On the other hand, control related to HARQ or repetition transmission (including retransmission) based on the congestion level or QoS (Quality of Service) parameters, etc., has not been executed, and, therefore, depending on the communication status, there has been a possibility that the performance is degraded.

The present invention has been made in view of the above points, and it is an object of the present invention to appropriately control retransmission in direct communication between terminals.

Means for Solving the Problem

According to the disclosed technology, there is provided a user equipment including a receiving unit configured to receive a configuration of a resource pool; a communicating unit configured to receive a physical control channel and a physical shared channel in the resource pool; a control unit configured to determine whether a response relating to retransmission control associated with the resource pool is enabled or disabled, based on the configuration of the resource pool; and a transmitting unit configured to transmit the response relating to the retransmission control with respect to the received physical shared channel, upon determining that the response relating to the retransmission control is enabled.

Advantage of the Invention

According to the disclosed technology, it is possible to appropriately control retransmission in direct communication between terminals.

EMBODIMENTS OF THE INVENTION

Hereinafter, an embodiment of the present invention will be described with reference to the drawings. Note that the embodiment described below is merely an example, and embodiments to which the present invention is applied are not limited to the following embodiment.

In the operation of the radio communication system according to an embodiment of the present invention, the existing technology is appropriately used. The existing technology is, for example, existing LTE; however, the existing technology is not limited to existing LTE. Furthermore, the term "LTE" used in the present specification shall have a broad meaning including LTE-Advanced and methods after LTE-Advanced (e.g., NR) or wireless LAN (Local Area Network) unless otherwise specified.

Furthermore, in the present embodiment, the duplex method may be the TDD (Time Division Duplex) method, the FDD (Frequency Division Duplex) method, or other methods (for example, the Flexible Duplex method).

Furthermore, in the embodiment of the present invention, the radio parameter, etc., being "configured" means that a predetermined value is "pre-configured", or a radio parameter, which is reported from the base station apparatus 10 or a user equipment 20, is configured.

Figure 1:
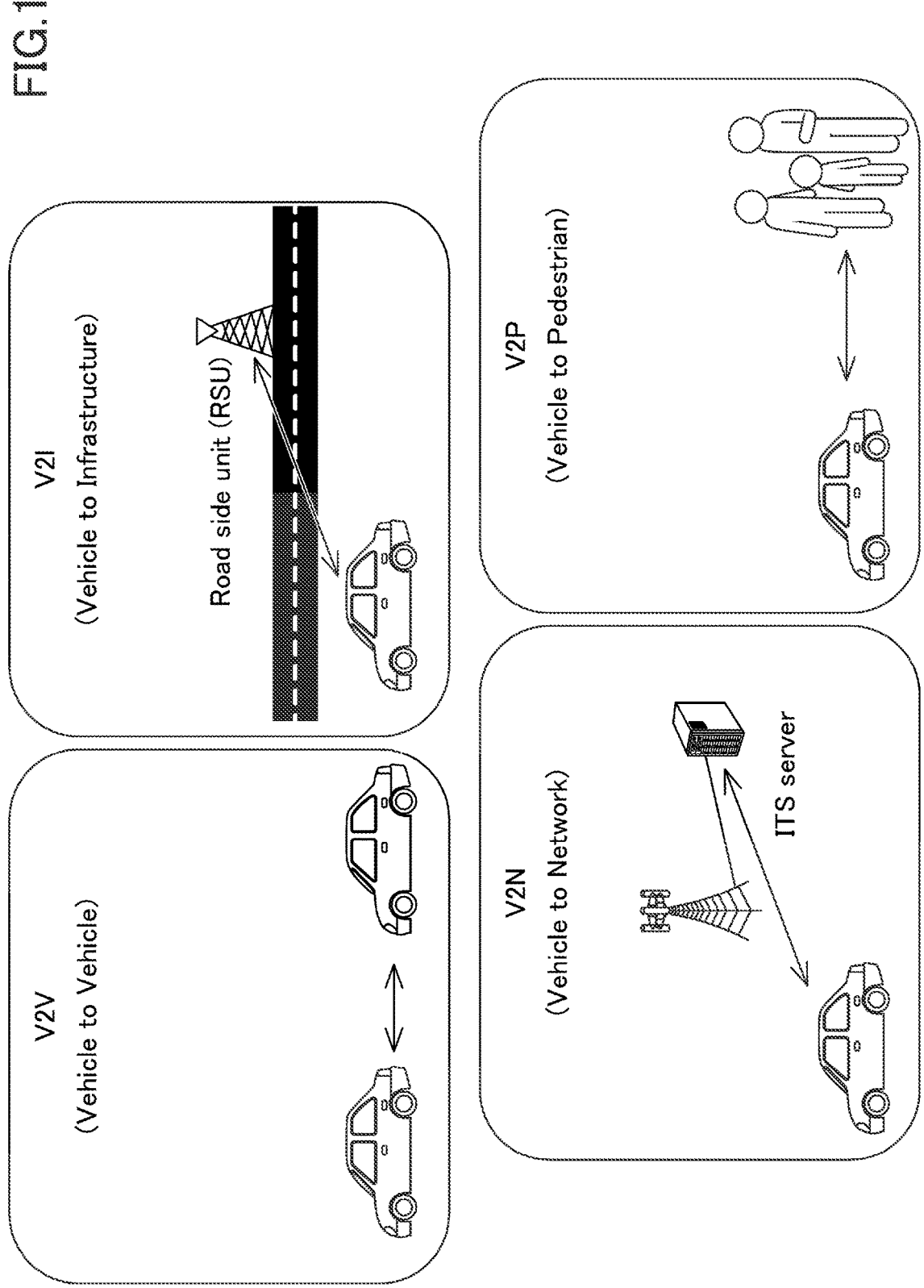
FIG. 1 is a diagram for describing V2X.

FIG. 1 is a diagram for describing V2X. In 3GPP, studies are being made to realize V2X (Vehicle to Everything) or eV2X (enhanced V2X) by extending the D2D function, and specifications of V2X are being made. As illustrated in FIG. 1, V2X is a part of ITS (Intelligent Transport Systems), and V2X is a collective term of V2V (Vehicle to Vehicle) meaning a communication mode implemented between vehicles, V2I (Vehicle to Infrastructure) meaning a communication mode implemented between a vehicle and a roadside unit (RSU) installed at the side of a road, V2N (Vehicle to Network) meaning a communication mode implemented between a vehicle and an ITS server, and V2P (Vehicle to Pedestrian) meaning a communication mode implemented between a vehicle and a mobile terminal of a pedestrian.

Furthermore, in 3GPP, V2X using cellular communication and inter-terminal communication of LTE or NR is being studied. V2X using cellular communication is also referred to as cellular V2X. In V2X of NR, studies are in progress for implementing larger capacity, low delay, high reliability, and QoS (Quality of Service) control.

For V2X of LTE or NR, it is assumed that studies not limited to the 3GPP specification, will be advanced. For example, it is assumed that securing interoperability, reducing costs by implementing an upper layer, a method of using a plurality of RATs (Radio Access Technology) in combination or a method of switching the RATs, addressing regulations in each country, acquiring and distributing data of a V2X platform of LTE or NR, and managing and using a database, will be studied.

In the embodiments of the present invention, a mode in which a communication apparatus is installed in a vehicle is mainly assumed; however, the embodiment of the present invention is not limited to such a mode. For example, the communication apparatus may be a terminal held by a person, or the communication apparatus may be an apparatus installed in a drone or an aircraft, or the communication apparatus may be a base station, an RSU, a relay station (relay node), or a user equipment having a scheduling capability, etc.

Note that SL (Sidelink) may be distinguished based on either UL (Uplink) or DL (Downlink) or one of or a combination of the following 1)-4). Furthermore, the SL may be another name.
1) Resource allocation in time domain
2) Resource allocation in the frequency domain
3) Synchronization signals (including SLSS (Sidelink Synchronization Signal)) to be referred to
4) Reference signals used for path loss measurement for transmission power control Further, with respect to OFDM (Orthogonal Frequency Division Multiplexing) of SL or UL, any one of CP-OFDM (Cyclic-Prefix OFDM), DFT-S-OFDM (Discrete Fourier Transform-Spread-OFDM), OFDM not subjected to transform precoding, or OFDM subjected to transform precoding may be applied.

In SL of LTE, Mode 3 and Mode 4 are specified with respect to resource allocation for SL to the user equipment 20. In Mode 3, transmission resources are dynamically allocated by DCI (Downlink Control Information) transmitted from the base station apparatus 10 to the user equipment 20. Furthermore, in Mode 3, SPS (Semi Persistent Scheduling) is also possible. In Mode 4, the user equipment 20 autonomously selects a transmission resource from the resource pool.

Note that a slot in embodiments of the present invention may be read as a symbol, a minislot, a subframe, a wireless frame, and a TTI (Transmission Time Interval). Further, a cell in embodiments of the present invention may be read as a cell group, a carrier component, a BWP, a resource pool, a resource, RAT (Radio Access Technology), a system (including wireless LAN), and the like.

Figure 2:
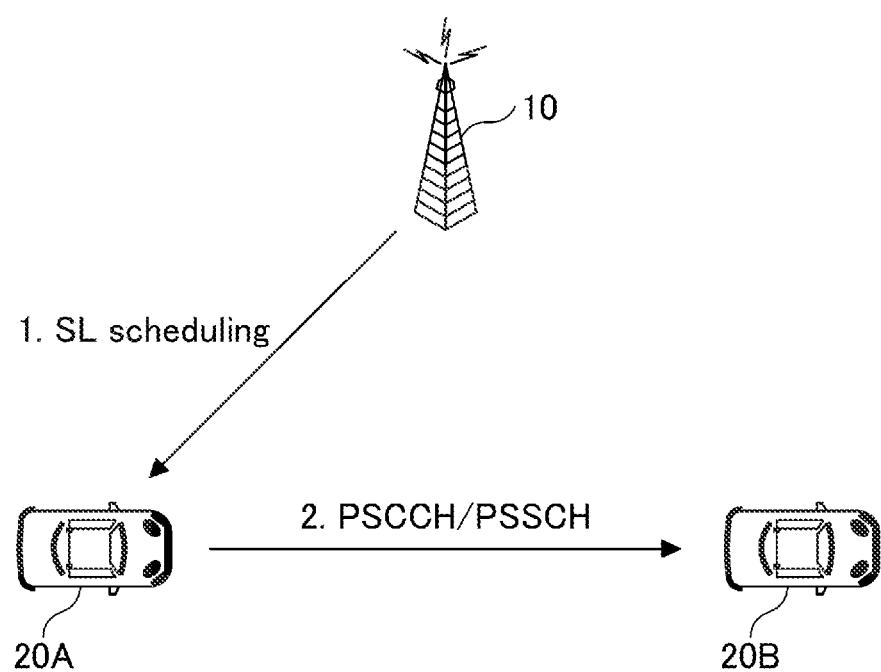
FIG. 2 is a diagram illustrating an example (1) of a transmission mode of V2X.

FIG. 2 is a diagram for describing an example (1) of a transmission mode of V2X. In the transmission mode of sidelink communication illustrated in FIG. 2, in step 1, a base station apparatus 10 transmits the sidelink scheduling to a user equipment 20A. Subsequently, the user equipment 20A transmits PSCCH (Physical Sidelink Control Channel) and PSSCH (Physical Sidelink Shared Channel) to a user equipment 20B based on the received scheduling (step 2). The transmission mode of the sidelink communication illustrated in FIG. 2 may be referred to as a sidelink transmission mode 3 in LTE. In the sidelink transmission mode 3 in LTE, Uu-based sidelink scheduling is performed. Uu is a wireless interface between UTRAN (Universal Terrestrial Radio Access Network) and UE (User Equipment). Note that the transmission mode of the sidelink communication illustrated in FIG. 2 may be referred to as a sidelink transmission mode 1 in the NR.

Figure 3:
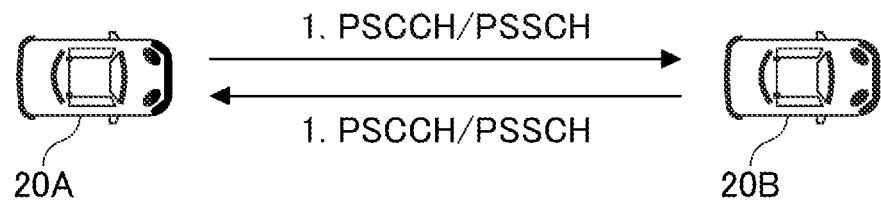
FIG. 3 is a diagram illustrating an example (2) of a transmission mode of V2X.

FIG. 3 is a diagram for describing an example (3) of a transmission mode of V2X. In the transmission mode for sidelink communication illustrated in FIG. 3, in step 1, the user equipment 20A transmits PSCCH and PSSCH to the user equipment 20B by using an autonomously selected resource. Similarly, the user equipment 20B transmits PSCCH and PSSCH to the user equipment 20A by using an autonomously selected resource (step 1). The transmission mode of the sidelink communication illustrated in FIG. 3 may be referred to as a sidelink transmission mode 2a in the NR. In the sidelink transmission mode 2 in the NR, the UE itself performs the resource selection.

Figure 4:
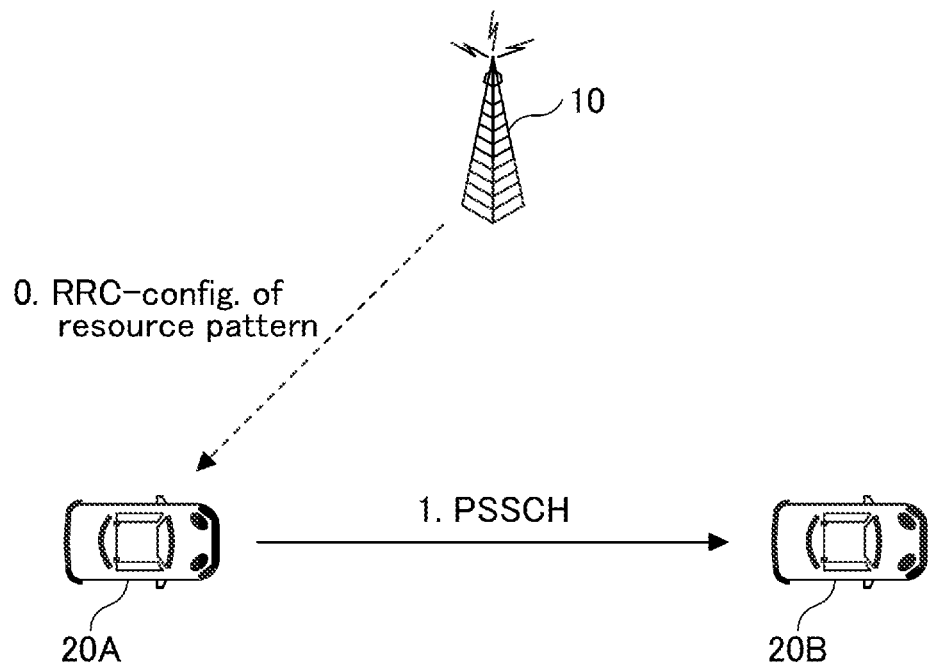
FIG. 4 is a diagram illustrating an example (3) of a transmission mode of V2X.

FIG. 4 is a diagram for describing an example (4) of a transmission mode of V2X. In the transmission mode of the sidelink communication illustrated in FIG. 4, in step 0, the base station apparatus 10 transmits a resource pattern of sidelink to the user equipment 20A via a RRC (Radio Resource Control) configuration. Subsequently, the user equipment 20A transmits the PSSCH to the user equipment 20B based on the received resource pattern (step 1). The transmission mode of the sidelink communication illustrated in FIG. 4 may be referred to as a sidelink transmission mode 2c in the NR.

Figure 5:
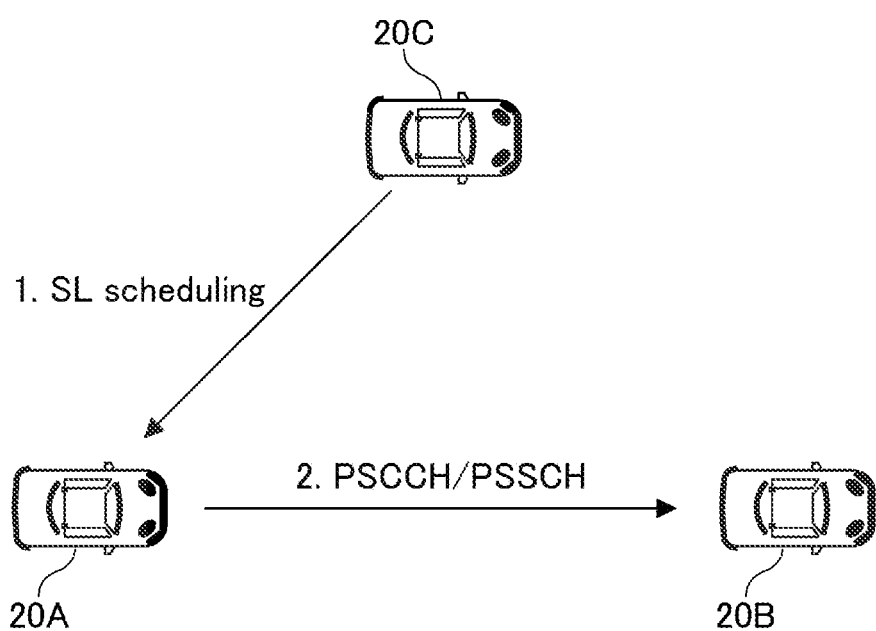
FIG. 5 is a diagram illustrating an example (4) of a transmission mode of V2X.

FIG. 5 is a diagram for describing an example (5) of a transmission mode of V2X. In the transmission mode of the sidelink communication illustrated in FIG. 5, in step 1, a user equipment 20C transmits the sidelink scheduling to the user equipment 20A via the PSCCH. Subsequently, the user equipment 20A transmits the PSSCH to the user equipment 20B based on the received scheduling (step 2). The transmission mode of the sidelink communication illustrated in FIG. 5 may be referred to as a sidelink transmission mode 2d in the NR.

Figure 6:
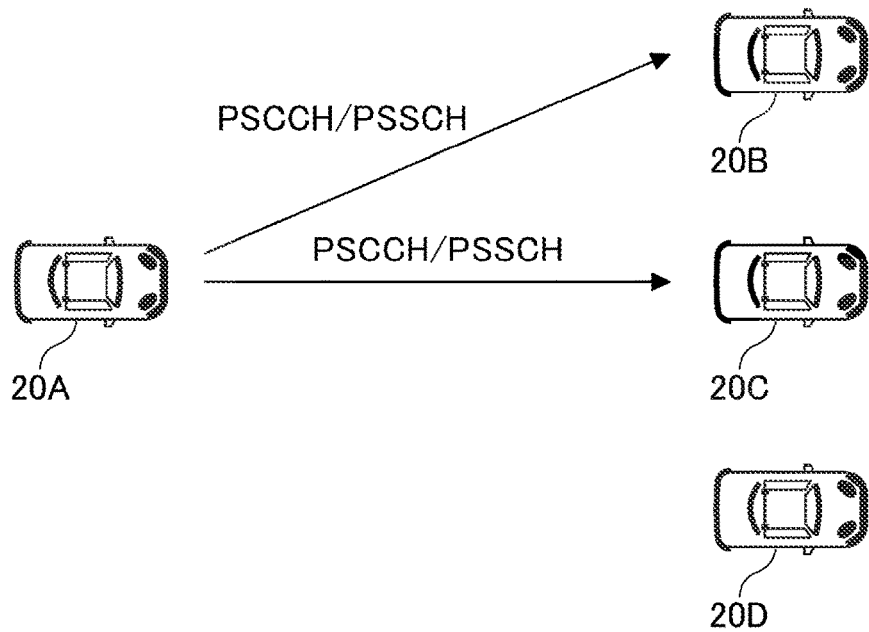
FIG. 6 is a diagram illustrating an example (1) of a communication type of V2X.

FIG. 6 is a diagram for describing an example (1) of a communication type of V2X. The sidelink communication type illustrated in FIG. 6 is unicast. The user equipment 20A transmits PSCCH and PSSCH to the user equipment 20. In the example illustrated in FIG. 6, the user equipment 20A performs unicast transmission to the user equipment 20B and performs unicast transmission to the user equipment 20C.

Figure 7:
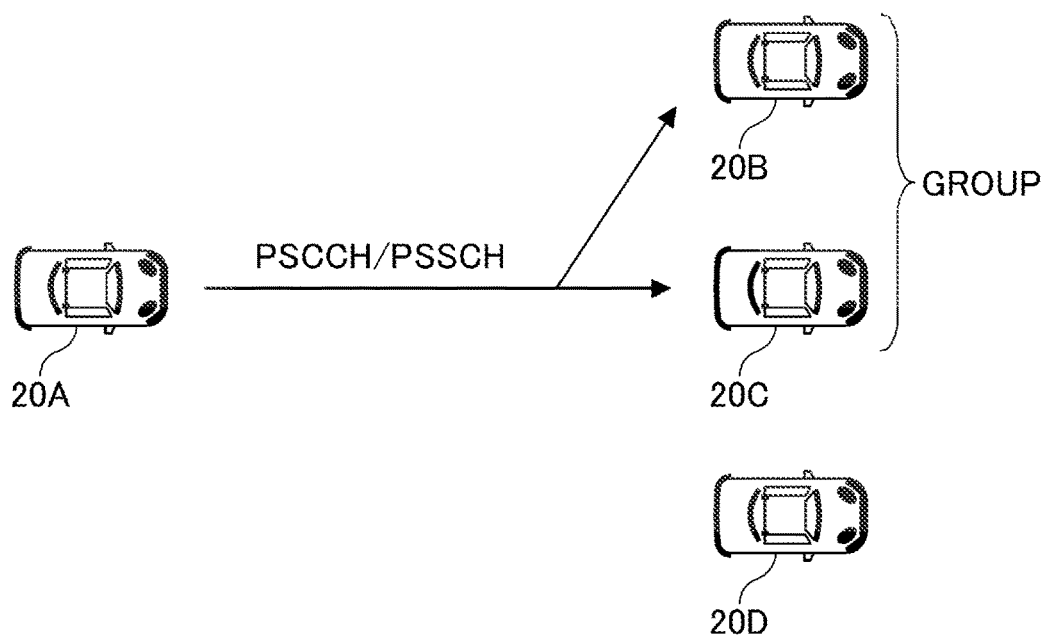
FIG. 7 is a diagram illustrating an example (2) of a communication type of V2X.

FIG. 7 is a diagram for describing an example (2) of a communication type of V2X. The sidelink communication type illustrated in FIG. 7 is a groupcast. The user equipment 20A transmits PSCCH and PSSCH to a group to which one or more of the user equipments 20 belong. In the example illustrated in FIG. 7, the group includes the user equipment 20B and the user equipment 20C, and the user equipment 20A performs groupcast transmission to the group.

Figure 8:
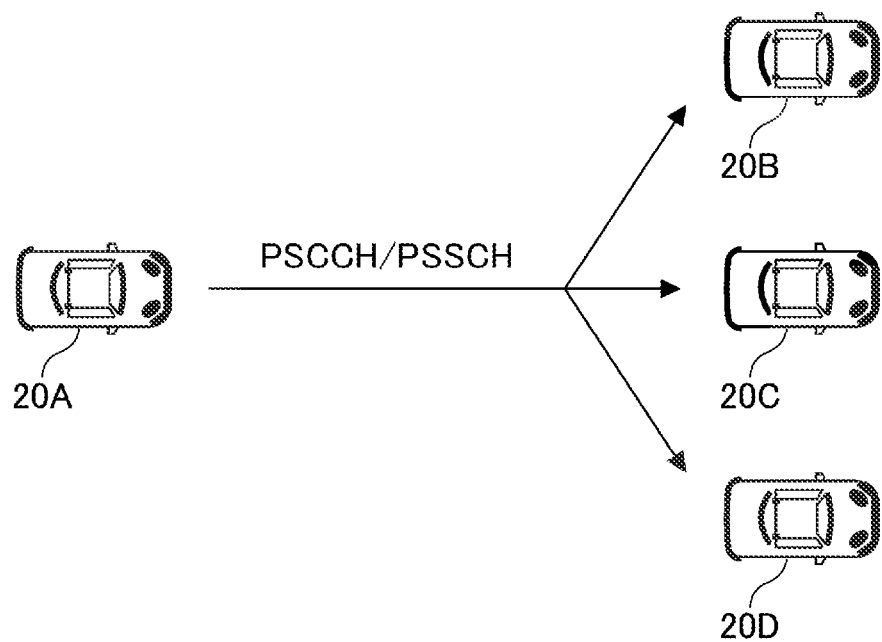
FIG. 8 is a diagram illustrating an example (3) of a communication type of V2X.

FIG. 8 is a diagram for describing an example (3) of a communication type of V2X. The sidelink communication type illustrated in FIG. 8 is broadcast. The user equipment 20A transmits PSCCH and PSSCH to one or more of the user equipments 20. In the example illustrated in FIG. 8, the user equipment 20A performs broadcast transmission to the user equipment 20B, the user equipment 20C, and a user equipment 20D.

Here, HARQ responses of sidelink are supported in unicast and groupcast. In unicast and groupcast of sidelink, it is necessary to configure whether to enable or disable HARQ responses. The HARQ responses may always be enabled, or the HARQ responses may actually be executed based on additional conditions.

HARQ responses in sidelink may be disabled according to need. Under conditions where the channel congestion level is high, retransmissions by HARQ may degrade the system performance. Further, retransmission is not always necessary if the required reliability or QoS (Quality of Service) level is low.

For example, when there is a sufficient amount of resources of the PSFCH (Physical Sidelink Feedback Channel) in the resource pool, the need to disable HARQ responses is not high. On the other hand, in terms of controlling the congestion level, enabling or disabling retransmissions by the transmitting UE is more important than enabling or disabling HARQ responses. Further, for example, when the reliability required for packet transmission in the resource pool is low, PSFCH does not have to be configured. That is, in terms of efficiently using resources, more resources may be allocated by data transmission without configuring PSFCH. In a resource pool where PSFCH is not configured, HARQ responses may be disabled.

As described above, for each resource pool, HARQ responses may be enabled or disabled. Further, retransmissions by the transmitting UE may be enabled or disabled based on control of QoS or the congestion level.

Figure 9:
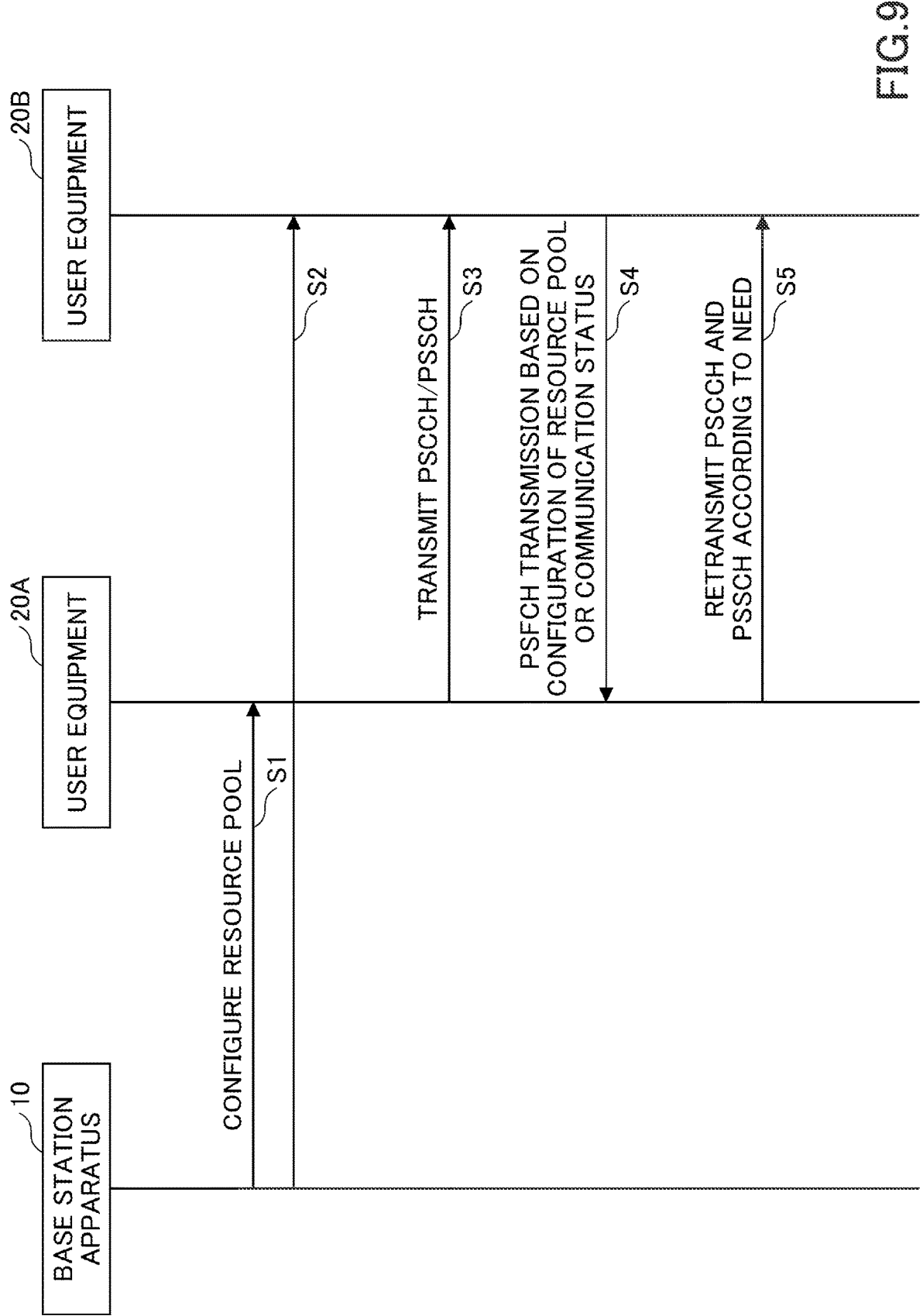
FIG. 9 is a sequence diagram illustrating an example of a HARQ response in V2X according to an embodiment of the present invention.

FIG. 9 is a sequence diagram illustrating an example of a HARQ response in V2X according to an embodiment of the present invention. FIG. 9 illustrates a method of configuring the HARQ response to be enabled or disabled in a manner specific to a resource pool.

In steps S1 and S2, the base station apparatus 10 transmits the configuration of the resource pool to the user equipment 20A and the user equipment 20B. As a first example, the configuration of the resource pool may include a configuration of HARQ responses. The configuration related to HARQ responses may be, for example, signaling of 1 bit indicating whether the HARQ response is enabled or disabled in the resource pool. As a second example, the configuration related to HARQ responses may be implicitly reported by the configuration of the resource pool. For example, if there is a resource configuration of PSFCH associated with the resource pool, the HARQ response may be enabled, and if there is no resource configuration of PSFCH associated with a resource pool, the HRQ response may be disabled. Further, for example, when the priority level in the resource pool exceeds a predetermined value, the HARQ response may be enabled, and when the priority level in the resource pool is less than or equal to a predetermined value, the HARQ response may be disabled. Note that the configuration of the resource pool in steps S1 and S2 may be transmitted from the user equipment 20 rather than from the base station apparatus 10.

In step S3, the user equipment 20A transmits PSCCH and PSSCH to the user equipment 20B in the resource pool based on the configuration of the resource pool received in step S1, and the user equipment 20B receives PSCCH and PSSCH. Subsequently, in step S4, the user equipment 20B performs the PSFCH transmission based on the configuration of the resource pool or the communication status.

Figure 10:
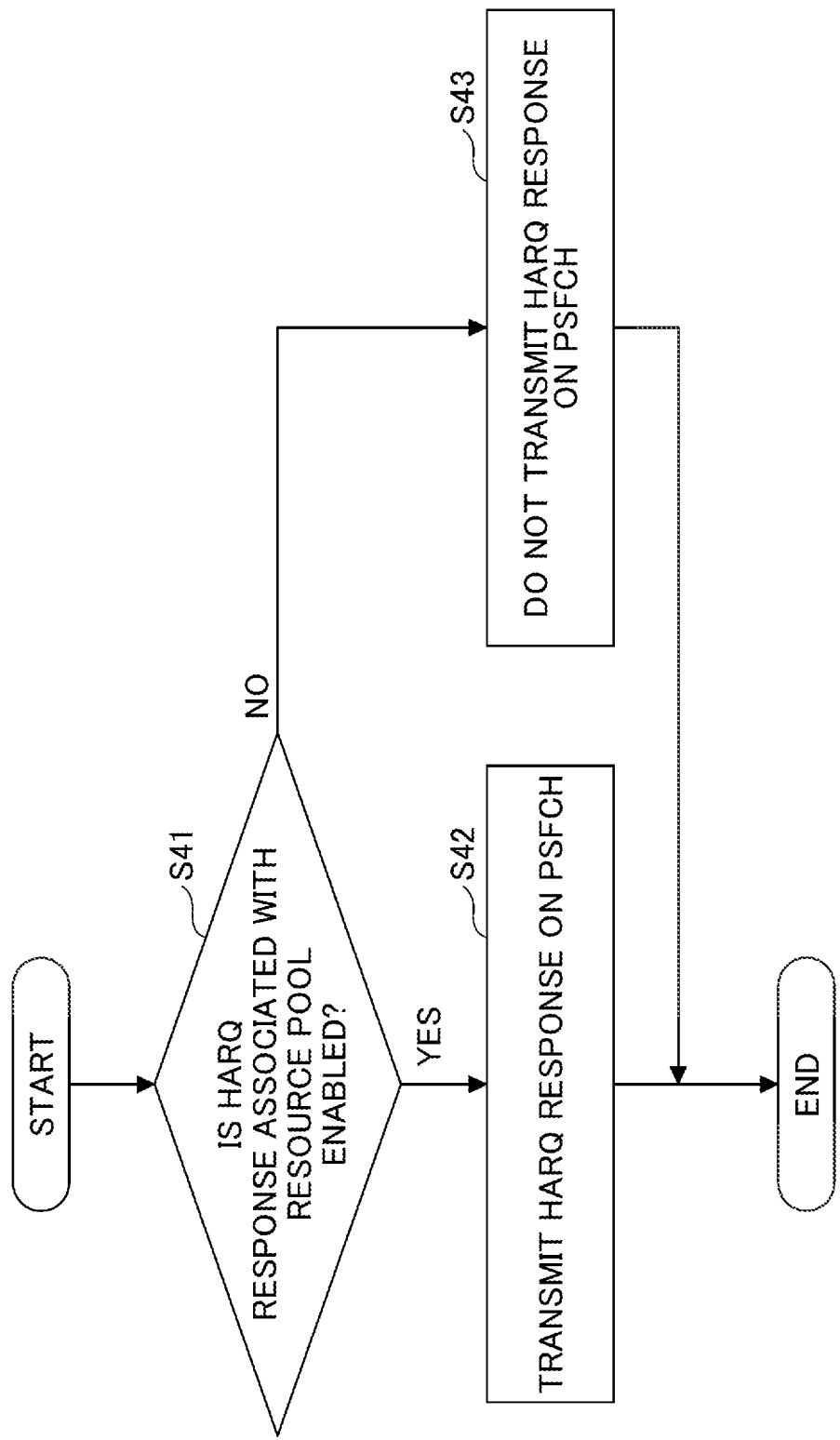
FIG. 10 is a flowchart illustrating an example (1) of a HARQ response in V2X according to an embodiment of the present invention.

FIG. 10 is a flowchart illustrating an example (1) of a HARQ response in V2X according to an embodiment of the present invention. Step S4 illustrated in FIG. 9 is described in detail with reference to FIG. 10.

In step S41, the user equipment 20B determines whether the HARQ response associated with the resource pool including the received PSSCH, is enabled. When the HARQ response is enabled (YES in S41), the process proceeds to step S42, and when the HARQ response is disabled (NO in S41), the process proceeds to step S43. The determination in step S41 is performed based on the configuration of the resource pool received in step S2 illustrated in FIG. 9.

In step S42, the user equipment 20B transmits a HARQ response to the user equipment 20A by PSFCH. On the other hand, in step S43, the user equipment 20B does not transmit a HARQ response to the user equipment 20A by PSFCH.

Note that the enabling or the disabling of the HARQ response may be configured, predefined, reported, activated, or deactivated. For example, HARQ responses may be enabled by default, and the network may disable HARQ responses by RRC signaling, MAC-CE (Medium Access Control-Control Element) signaling, or DCI (Downlink Control Information).

In the user equipment 20, the enabling or disabling of HARQ responses may be configured, reported, activated, or deactivated, by RRC signaling, MAC-CE signaling, or SCI (Sidelink Control Information) signaling via the sidelink. For example, the enabling or disabling of HARQ responses may be defined in a separate field of signaling by DCI or SCI. Further, the enabling or disabling of HARQ responses may be defined by a special combination of existing fields that are not directly related to HARQ responses of the above signaling. Further, the enabling or disabling of HARQ responses may be defined by a new DCI or SCI format. Further, the enabling or disabling of HARQ responses may be defined by RNTI (Radio Network Temporary Identifier), CORESET (Control Resource Set), or search space.

Note that the enabling or disabling of HARQ responses may be reported by an enabling indicator for HARQ responses included in the SCI. The indicator may be jointly encoded in the PSFCH resource configuration or the timing configuration of PSCCH and HARQ responses. Further, the indicator may be included in DCI or SCI for scheduling the sidelink transmission.

Returning to FIG. 9, in step S5, the user equipment 20A retransmits PSCCH and PSSCH to the user equipment 20B according to need.

Figure 11:
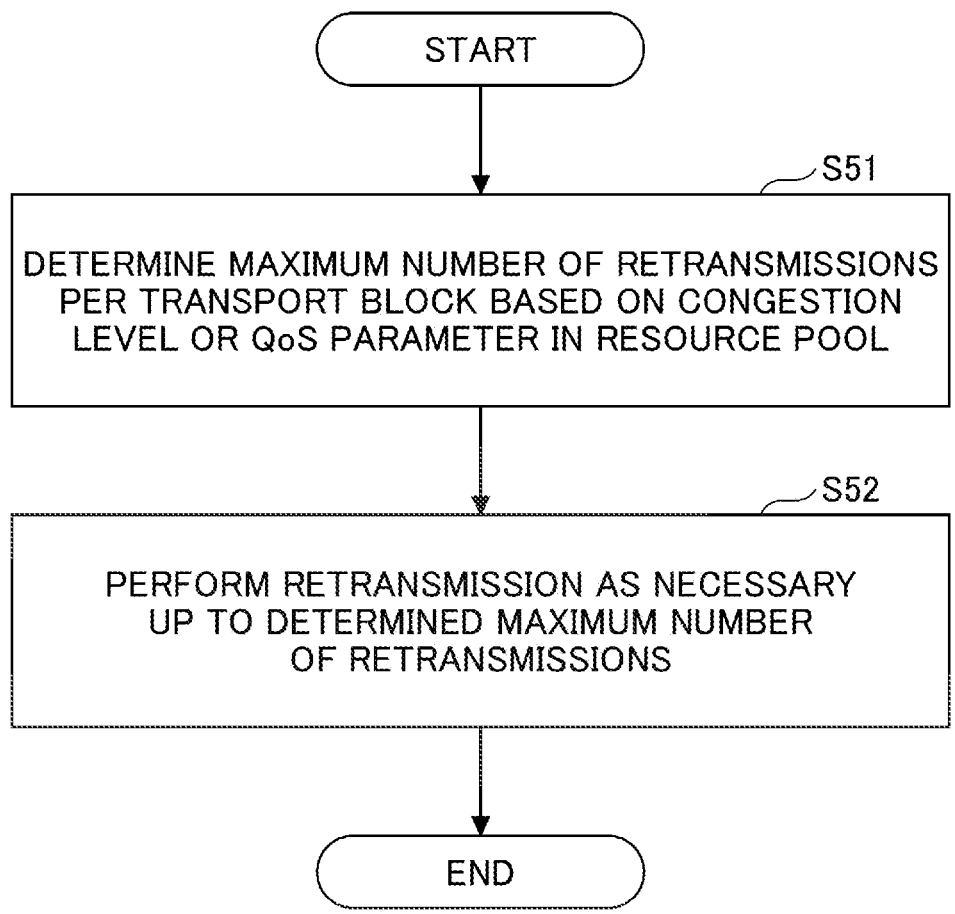
FIG. 11 is a flowchart illustrating an example (2) of a HARQ response in V2X according to an embodiment of the present invention.

FIG. 11 is a flowchart illustrating an example (2) of a HARQ response in V2X according to an embodiment of the present invention. Step S5 illustrated in FIG. 9 is described in detail with reference to FIG. 11.

In step S51, the user equipment 20A determines the maximum number of retransmissions per transport block based on the congestion level or the QoS parameter in the resource pool. Table 1 indicates examples of mapping of the congestion level or QoS parameter in the resource pool to the maximum number of retransmissions.

TABLE 1

| Congestion level | Priority level | Reliability | Maximum number of retransmissions per transport block |
|---|---|---|---|
| 0.5-1 | Priority#0 | Reliability $10^{-6}$ | 5 |
|  | Priority#1 | Reliability $10^{-5}$ | 4 |
|  | Priority#2 | Reliability $10^{-4}$ | 3 |
| ... | ... | ... | ... |
| 0-0.5 | Priority#0 | Reliability $10^{-6}$ | 3 |
|  | Priority#1 | Reliability $10^{-5}$ | 2 |
| ... | ... | ... | ... |

As indicated in Table 1, the congestion level, the priority level, the reliability, and the maximum number of retransmissions are associated with each other. The congestion level may be, for example, CBR (Channel Busy Ratio). The priority level is associated with 5G QoS characteristics, with lower values defined as higher priority levels. The reliability may be, for example, a PER (Packet Error Rate). The PER indicates the upper limit of the ratio of the PDUs such as an IP packet, that have not been successfully received, to the PDUs that have been transmitted.

As indicated in Table 1, for example, when the congestion level is 0.5 to 1, and the priority level is "Priority #0" or the reliability is "10 to the minus sixth power", the maximum number of retransmissions per transport block is configured to be 5. Further, for example, when the congestion level is 0.5 to 1, and the priority level is "Priority #1" or the reliability is "10 to the minus fifth power", the maximum number of retransmissions per transport block is configured to be 4. For example, when the congestion level is 0.5 to 1, and the priority level is "Priority #2" or the reliability is "10 to the minus fourth power", the maximum number of retransmissions per transport block is configured to be 3. For example, when the congestion level is 0 to 0.5, and the priority level is "Priority #0" or the reliability is "10 to the minus sixth power", the maximum number of retransmissions per transport block is configured to be 3. For example, when the congestion level is 0 to 0.5 to 1, and the priority level is "Priority #1" or the reliability is "10 to the minus fifth power", the maximum number of retransmissions per transport block is configured to be 2. As described above, the maximum number of retransmissions may be configured to be a small number with respect to a lower priority level or lower reliability.

In step S52, the user equipment 20A performs retransmission as necessary up to the maximum number of retransmissions determined in step S51. Note that the transmitting UE may report, to the receiving UE, the maximum number of retransmissions, for example, via the SCI. Further, the maximum number of retransmissions may be the total number of transmissions obtained by adding the number of repetition transmissions that are not performed by HARQ responses and the number of retransmissions that are performed by HARQ responses; or the maximum number of retransmissions may be either the number of repetition transmissions that are not performed by HARQ responses or the number of retransmissions that are performed by HARQ responses. The number of repetition transmissions that are not performed by HARQ responses may be referred to as blind retransmissions, or may be referred to as repetition(s). Note that in Table 1, the mapping with respect to the congestion level and the priority level or the reliability, may be different between the number of repetition transmissions that are not performed by HARQ responses and the number of retransmissions that are performed by HARQ responses. Note that the above described number of repetition transmissions that are not performed by HARQ responses may be the number of repetition transmissions, or may be the number of transmissions by PSSCH in a plurality of slots scheduled via one DCI or SCI.

Note that in step S52, the retransmission of the transport block may be performed when the actual number of transmissions including retransmissions is less than the maximum number of transmissions indicated in Table 1. That is, if the actual number of transmissions is the same as the maximum number of transmissions indicated in Table 1, the user equipment 20A does not have to perform further retransmissions. Further, if the retransmission based on HARQ responses is applied, the retransmission of the transport block may be performed only when a NACK or DTX of the HARQ response is detected.

The maximum number of transmissions indicated in Table 1 may be updated at any time based on the congestion level or QoS parameter of the resource pool. The updated maximum number of transmissions may be reported to the receiving UE or another UE via the SCI.

According to the embodiments described above, the user equipment 20 can determine whether to transmit a HARQ response based on information indicating the enabling or the disabling of HARQ responses associated with the resource pool. Further, the user equipment 20 can determine the maximum number of transmissions of a transport block based on the priority level or the reliability mapped with the congestion level of the sidelink.

That is, in direct communication between terminals, a response related to retransmission control can be appropriately transmitted.

(Apparatus Configuration)

Next, a functional configuration example of the base station apparatus 10 and the user equipment 20 that execute the above-described processes and operations, will be described. The base station apparatus 10 and the user equipment 20 include functions for implementing the above-described embodiments. However, each of the base station apparatus 10 and the user equipment 20 may have only some of the functions of the embodiments.

<Base Station Apparatus 10>

Figure 12:
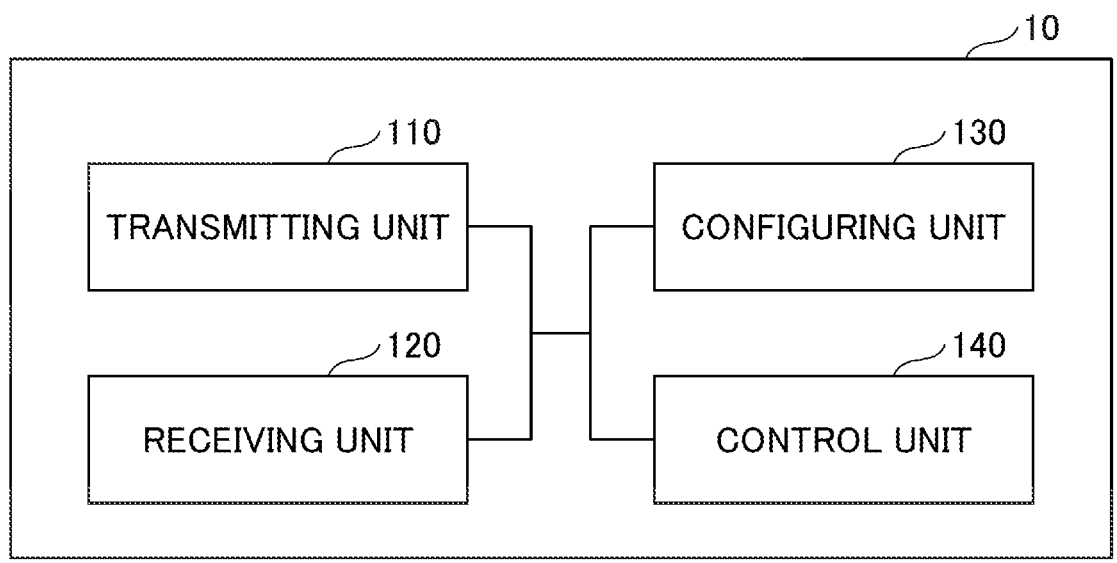
FIG. 12 is a diagram illustrating an example of a functional configuration of a base station apparatus 10 according to the embodiment of the present invention.

FIG. 12 is a diagram illustrating an example of a functional configuration of the base station apparatus 10. As illustrated in FIG. 12, the base station apparatus 10 includes a transmitting unit 110, a receiving unit 120, a configuring unit 130, and a control unit 140. The functional configuration illustrated in FIG. 12 is only an example. As long as the operations according to the embodiment of the present invention can be executed, the functional division and the name of the functional unit may be any functional division and name.

The transmitting unit 110 includes a function of generating signals to be transmitted to the user equipment 20, and transmitting the signals in a wireless manner. The receiving unit 120 includes a function of receiving various signals transmitted from the user equipment 20, and acquiring, for example, information of a higher layer from the received signals. Furthermore, the transmitting unit 110 has a function of transmitting NR-PSS, NR-SSS, NR-PBCH, DL/UL control signals, and DL reference signals, etc., to the user equipment 20.

The configuring unit 130 stores pre-configured configuration information and various kinds of configuration information to be transmitted to the user equipment 20, in a storage device, and reads these pieces of information from the storage device as necessary. The content of the configuration information is, for example, information related to configuring of D2D communication and retransmission control.

As described in the embodiment, the control unit 140 performs processing related to configurations for performing D2D communication by the user equipment 20. Furthermore, the control unit 140 transmits the scheduling of D2D communication to the user equipment 20 via the transmitting unit 110. Further, the control unit 140 determines the parameters related to the retransmission control of the D2D communication and transmits the parameters to the user equipment 20 via the transmitting unit 110. A functional unit related to signal transmission in the control unit 140, may be included in the transmitting unit 110, and a functional unit related to signal reception in the control unit 140, may be included in the receiving unit 120.

<User Equipment 20>

Figure 13:
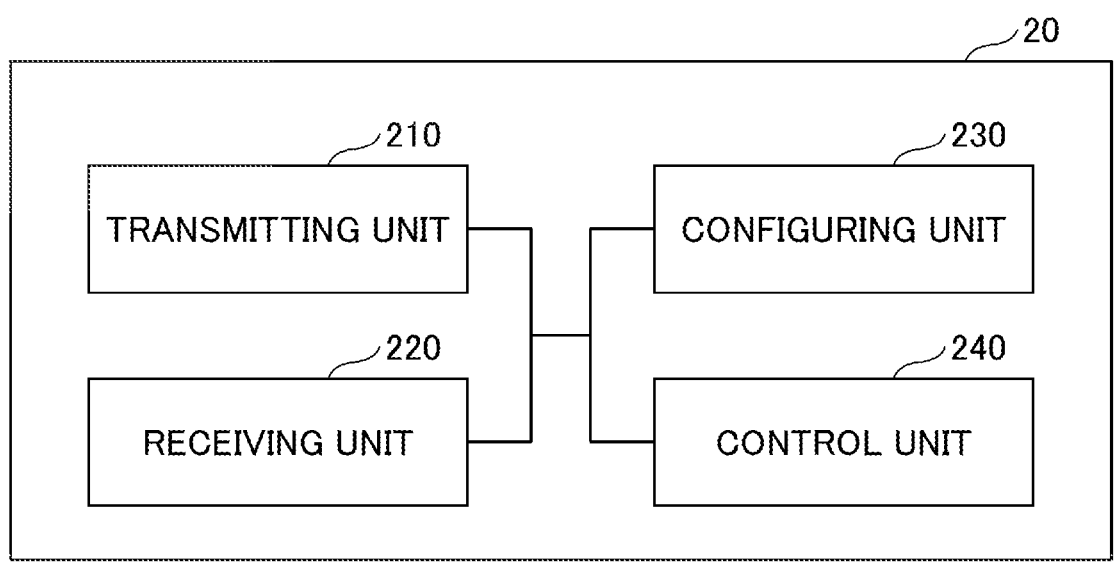
FIG. 13 is a diagram illustrating an example of a functional configuration of a user equipment 20 according to the embodiment of the present invention.

FIG. 13 is a diagram illustrating an example of a functional configuration of the user equipment 20. As illustrated in FIG. 13, the user equipment 20 includes a transmitting unit 210, a receiving unit 220, a configuring unit 230, and a control unit 240. The functional configuration illustrated in FIG. 13 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving NR-PSS, NR-SSS, NR-PBCH, and DL/UL/SL control signals or reference signals, etc., transmitted from the base station apparatus 10. Furthermore, for example, the transmitting unit 210 may transmit as D2D communication, to another user equipment 20, PSCCH (Physical Sidelink Control Channel), PSSCH (Physical Sidelink Shared Channel), PSDCH (Physical Sidelink Discovery Channel), and PSBCH (Physical Sidelink Broadcast Channel), etc., and the receiving unit 220 may receive, from another user equipment 20, PSCCH, PSSCH, PSDCH, or PSBCH, etc.

The configuring unit 230 stores various kinds of configuration information received from the base station apparatus 10 or the user equipment 20, by the receiving unit 220, in a storage device, and reads these pieces of information from the storage device as necessary. Furthermore, the configuring unit 230 also stores pre-configured configuration information. The content of the configuration information is, for example, information related to configuring of D2D communication and configuring of retransmission control.

As described in the embodiment, the control unit 240 controls the D2D communication between the user equipment 20 and another user equipment 20. Furthermore, the control unit 240 performs a process related to HARQ of D2D communication. Further, the control unit 240 may perform scheduling of D2D communication and transmit parameters related to retransmission control to another user equipment 20. A functional unit related to signal transmission in the control unit 240 may be included in the transmission unit 210, and a functional unit related to signal reception in the control unit 240 may be included in the reception unit 220.

(Hardware Configuration)

The block diagrams (FIGS. 12 and 13) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

Figure 14:
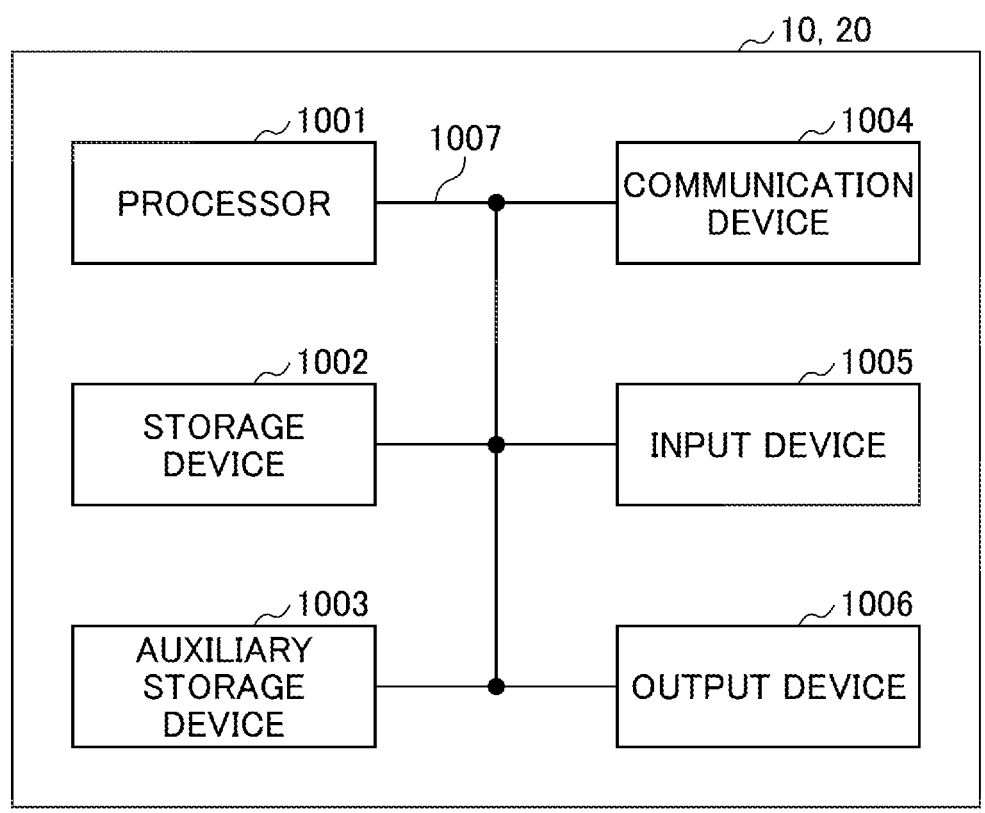
FIG. 14 is a diagram illustrating an example of a hardware configuration of the base station apparatus 10 or the user equipment 20 according to the embodiment of the present invention.

For example, the base station apparatus 10 and the user equipment 20, etc., according to the embodiment of the present disclosure may function as a computer that performs processes of the radio communication method according to the present disclosure. FIG. 14 is a diagram illustrating an example of a hardware configuration of the base station apparatus 10 and the user equipment 20 according to the embodiment of the present disclosure. The base station apparatus 10 and the user equipment 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the base station apparatus 10 and the user equipment 20 may be configured to include one or more devices illustrated in the figure, or may be configured to not include some of the devices.

The functions of the base station apparatus 10 and the user equipment 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the base station apparatus 10 illustrated in FIG. 12 may be implemented by a control program stored in the storage device 1002 and operating on the processor 1001. Furthermore, the control unit 240 of the user equipment 20 illustrated in FIG. 13 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by the bus 1007 for communicating information. The bus 1007 may be formed of a single bus or may be formed by using different buses between the devices.

Furthermore, the base station apparatus 10 and the user equipment 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

(Conclusion of the Embodiments)

As described above, according to the embodiments of the present invention, there is provided a user equipment including a receiving unit configured to receive a configuration of a resource pool; a communicating unit configured to receive a physical control channel and a physical shared channel in the resource pool; a control unit configured to determine whether a response relating to retransmission control associated with the resource pool is enabled or disabled, based on the configuration of the resource pool; and a transmitting unit configured to transmit the response relating to the retransmission control with respect to the received physical shared channel, upon determining that the response relating to the retransmission control is enabled.

With the above configuration, the user equipment 20 can determine whether to transmit a HARQ response based on information indicating whether a HARQ response associated with the resource pool is enabled or disabled. That is, in direct communication between terminals, a response relating to retransmission control can be appropriately transmitted.

The control unit may determine whether the response relating to the retransmission control associated with the resource pool is enabled or disabled, based on signaling of 1 bit indicating enabled or disabled included in the configuration of the resource pool. With this configuration, the user equipment 20 can determine whether to transmit a HARQ response based on information indicating whether a HARQ response associated with the resource pool is enabled or disabled.

The control unit may determine whether the response relating to the retransmission control associated with the resource pool is enabled or disabled, based on whether a channel to be used for transmitting and receiving the response relating to the retransmission control is associated with the resource pool, in the configuration of the resource pool. With this configuration, the user equipment 20 can determine whether to transmit a HARQ response based on information indicating whether a HARQ response associated with the resource pool is enabled or disabled.

The control unit may determine whether the response relating to the retransmission control associated with the resource pool is enabled or disabled, based on whether a priority level configured in the resource pool exceeds a predetermined priority level, in the configuration of the resource pool. With this configuration, the user equipment 20 can determine whether to transmit a HARQ response based on information indicating whether a HARQ response associated with the resource pool is enabled or disabled.

Further, according to the embodiment of the present invention, there is provided a user equipment including a receiving unit configured to receive a configuration of a resource pool; a communicating unit configured to transmit a physical control channel and a physical shared channel in the resource pool; a control unit configured to determine a maximum number of retransmissions in retransmission control associated with the resource pool, based on the configuration of the resource pool; and a transmitting unit configured to execute the retransmission control of the transmitted physical shared channel, based on the determined maximum number of retransmissions.

With the above configuration, the user equipment 20 can determine the maximum number of transmissions of a transport block based on the priority level or reliability mapped with the congestion level of the sidelink. That is, in direct communication between terminals, a response relating to retransmission control can be appropriately transmitted.

The control unit may determine the maximum number of retransmissions, based on a priority level or reliability configured in the resource pool and a congestion level of the resource pool. With the above configuration, the user equipment 20 can determine the maximum number of transmissions of a transport block based on the priority level or reliability mapped with the congestion level of the sidelink.

Supplemental Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the base station apparatus 10 and the user equipment 20 are described by using the functional block diagrams; however, such devices may be implemented in hardware, software, or combinations thereof. The software to be executed by the processor included in the base station apparatus 10 in accordance with the embodiment of the present invention and the software to be executed by the processor included in the user equipment 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR (new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the base station apparatus 10 may be performed by an upper node in some cases. In the network configured with one or a plurality of network nodes including the base station apparatus 10, various actions performed for communication with the user equipment 20 can be obviously performed by at least one of the base station apparatus 10 and any network node (for example, an MME or an S-GW, etc., is considered, but it is not limited thereto) other than the base station apparatus 10. The example in which the number of network nodes excluding the base station apparatus 10 is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling). Further, a signal may be a message. Further, a component carrier (CC) may be referred to as a "carrier frequency," a "cell," or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be read as a user terminal. For example, the communication between the base station and the user terminal is replaced with communication (for example, may be referred to as D2D (Device-to-Device), V2X (Vehicle-to-Everything)) between a plurality of the user equipments 20, and each aspect/embodiment of the present disclosure may be applied to the configuration after replacement. In this case, the user equipment 20 may have the functions of the base station apparatus 10 described above. Furthermore, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements.

The coupling or connection between elements may be physical coupling or connection, logical coupling or connection, or a combination thereof. For example, "connect" may be read as "access". In the disclosure, it can be considered that two elements are "connected" or "coupled" to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

The radio frame may be formed of one or more frames in the time domain. In the time domain, each of the one or more frames may be referred to as a subframe. The subframe may further include one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), a number of symbols per TTI, a radio frame configuration, a particular filtering process performed in the frequency domain by the transceiver, a specific windowing process performed in the time domain by the transceiver, etc.

A slot may be formed of one or more symbols (OFDM (Orthogonal Frequency Division Multiplexing) symbol, SC-FDMA (Single Carrier Frequency Division Multiple Access) symbol, etc.) in the time domain. The slot may be a time unit based on the numerology.

A slot may include a plurality of minislots. Each minislot may be formed of one or more symbols in the time domain. Furthermore, the minislot may be referred to as a subslot. A minislot may be formed of fewer symbols than a slot. The PDSCH (or PUSCH) transmitted in units of time greater than the minislots, may be referred to as PDSCH (or PUSCH) mapping type A. The PDSCH (or PUSCH) transmitted using minislots may be referred to as PDSCH (or PUSCH) mapping type B.

Radio frames, subframes, slots, minislots, and symbols all represent time units for transmitting signals. Radio frames, subframes, slots, minislots, and symbols may respectively be referred to by different names.

For example, one subframe may be referred to as a transmission time interval (TTI), or a plurality of consecutive subframes may be referred to as a TTI, or one slot or one minislot may be referred to as a TTI. That is, at least one of a subframe and TTI may be a subframe (1 ms) in existing LTE, a period shorter than 1 ms (for example, 1-13 symbols), or a period longer than 1 ms. Note that the unit representing TTI may be referred to as a slot, a minislot, etc., instead of a subframe.

Here, the TTI refers to the minimum time unit of scheduling in radio communication, for example. For example, in the LTE system, the base station performs scheduling for allocating radio resources (frequency bandwidth, transmission power, etc., that can be used in each user equipment 20) in units of TTIs, to each user equipment 20. Note that the definition of TTI is not limited as such.

The TTI may be a transmission time unit such as a channel coded data packet (transport block), a code block, a codeword, etc., or may be a processing unit such as scheduling, link adaptation, etc. Note that when a TTI is given, a time interval (for example, the number of symbols) in which a transport block, a code block, a code word, etc., is actually mapped, may be shorter than the TTI.

Note that when one slot or one minislot is referred to as a TTI, one or more TTIs (i.e., one or more slots or one or more minislots) may be the minimum time unit of scheduling. Also, the number of slots (the number of minislots) constituting the minimum time unit of the scheduling, may be controlled.

A TTI having a time length of 1 ms may be referred to as a regular TTI (TTI in LTE Rel. 8-12), a normal TTI, a long TTI, a regular subframe, a normal subframe, a long subframe, a slot, etc. A TTI shorter than the regular TTI may be referred to as a reduced TTI, a short TTI, a partial or fractional TTI, a reduced subframe, a short subframe, a minislot, a subslot, a slot, etc.

Note that a long TTI (for example, a regular TTI, a subframe, etc.) may be read as a TTI having a time length exceeding 1 ms, and a short TTI (for example, a reduced TTI, etc.) may be read as a TTI having a TTI length that is less than the TTI length of the long TTI and greater than or equal to 1 ms.

The resource block (RB) is a resource allocation unit in the time domain and the frequency domain, and may include one or more consecutive subcarriers in the frequency domain. The number of subcarriers included in the RB may be the same irrespective of the numerology, for example, the number may be 12. The number of subcarriers included in the RB may be determined based on the numerology.

Furthermore, the time domain of the RB may include one or more symbols, and may have a length of one slot, one minislot, one subframe, or one TTI. Each TTI, each subframe, etc., may be formed of one or more resource blocks.

Note that one or more RBs may be referred to as a physical resource block (PRB), a subcarrier group (SCG: Sub-Carrier Group), a resource element group (REG: Resource Element Group), a PRB pair, and an RB pair, etc.

Furthermore, the resource block may be formed of one or more resource elements (RE). For example, the one RE may be a radio resource area of one subcarrier and one symbol.

A bandwidth part (BWP) (which may be referred to as partial bandwidth) may represent a subset of consecutive common resource blocks (RBs) for a certain numerology, in a certain carrier. Here, the common RB may be identified by the index of the RB based on the common reference point of the carrier. The PRB may be defined by a certain BWP and numbered in the BWP.

The BWP may include BWP for UL (UL BWP) and BWP for DL (DL BWP). For the UE, one or more BWPs may be configured within one carrier.

At least one of the configured BWPs may be active, and the UE does not have to assume transmitting and receiving predetermined signals/channels outside of the active BWP. Note that a "cell", a "carrier", etc., in the present disclosure may be read as "BWP".

Structures such as the radio frames, subframes, slots, minislots, and symbols described above are merely illustrative. For example, configurations such as the number of subframes included in the radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, etc., may be variously changed.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that in the present disclosure, the HARQ response is an example of response relating to retransmission control. PSSCH is an example of a physical shared channel. PSFCH is an example of a channel used for transmitting and receiving a response relating to retransmission control. PSCCH is an example of a physical control channel. The transmitting unit 210 or the receiving unit 220 is an example of a communicating unit.

Although the present disclosure has been described in detail above, it will be obvious to those skilled in the art that the present disclosure is not limited to the embodiments described herein. The present disclosure can be implemented as modifications and variations without departing from the spirit and scope of the present disclosure as defined by the scope of the claims. Therefore, the description of the present disclosure is for the purpose of illustration and does not have any restrictive meaning to the present disclosure.

LIST OF REFERENCE SYMBOLS

10 base station apparatus
110 transmitting unit
120 receiving unit
130 configuring unit
140 control unit
20 user equipment
210 transmitting unit
220 receiving unit
230 configuring unit
240 control unit
1001 processor
1002 storage device
1003 auxiliary storage device
1004 communication device
1005 input device
1006 output device

The invention claimed is:

1. A terminal comprising:
    a receiver configured to receive a configuration of a resource pool from a base station;
    a transmitter configured to transmit a physical shared channel to another terminal in the resource pool; and
    a processor configured to execute retransmission control of the physical shared channel based on a maximum number of retransmissions associated with a range of a congestion level and a priority level,
    wherein the range of the congestion level is indicated in the configuration of the resource pool.

2. A communication method executed by a terminal, the method comprising:
    receiving a configuration of a resource pool from a base station;
    transmitting a physical shared channel to another terminal in the resource pool; and
    executing retransmission control of the physical shared channel based on a maximum number of retransmissions associated with a range of a congestion level and a priority level,
    wherein the range of the congestion level is indicated in the configuration of the resource pool.

3. A communication system comprising:
    a base station; and
    a terminal,
    wherein the base station includes a base station transmitter configured to transmit a configuration of a resource pool to the terminal, and
    wherein the terminal includes
    a receiver configured to receive the configuration of the resource pool from the base station,
    a transmitter configured to transmit a physical shared channel to another terminal in the resource, and
    a processor configured to execute retransmission control of the physical shared channel based on a maximum number of retransmissions associated with a range of a congestion level and a priority level,
    wherein the range of the congestion level is indicated in the configuration of the resource pool.

* * * * *